United States Patent
Khiani et al.

(10) Patent No.: US 9,658,609 B2
(45) Date of Patent: May 23, 2017

(54) DEVICE ASSISTED SETTINGS ADJUSTMENT FOR HVAC CONTROLLERS

(71) Applicant: Lennox Industries Inc., Richardson, TX (US)

(72) Inventors: Sunil K. Khiani, Plano, TX (US); Nguyen Ho, Highland Village, TX (US)

(73) Assignee: Lennox Industries Inc., Richardson, TX (US)

( * ) Notice: Subject to any disclaimer, the term of this patent is extended or adjusted under 35 U.S.C. 154(b) by 459 days.

(21) Appl. No.: 14/270,892

(22) Filed: May 6, 2014

(65) Prior Publication Data

US 2015/0323209 A1    Nov. 12, 2015

(51) Int. Cl.
  *G01M 1/38*    (2006.01)
  *G05B 15/02*   (2006.01)
  *F24F 11/00*   (2006.01)

(52) U.S. Cl.
  CPC .......... *G05B 15/02* (2013.01); *F24F 11/006* (2013.01); *F24F 11/0009* (2013.01); *F24F 2011/0071* (2013.01); *G05B 2219/2614* (2013.01); *G05B 2219/2642* (2013.01)

(58) Field of Classification Search
  None
  See application file for complete search history.

(56) References Cited

U.S. PATENT DOCUMENTS

| | | | | |
|---|---|---|---|---|
| 5,289,362 | A * | 2/1994 | Liebl | G06Q 50/06 165/268 |
| 2005/0242201 | A1* | 11/2005 | Shorrock | F24F 11/0017 236/49.3 |
| 2006/0161306 | A1* | 7/2006 | Federspiel | F24F 11/0012 700/276 |
| 2007/0020460 | A1* | 1/2007 | Torrey | C09D 163/00 428/416 |
| 2008/0012310 | A1* | 1/2008 | Weaver | B08B 9/049 285/288.1 |
| 2009/0140056 | A1* | 6/2009 | Leen | F24F 11/0086 236/49.3 |
| 2009/0143915 | A1* | 6/2009 | Dougan | F24F 11/0034 700/276 |
| 2010/0044449 | A1* | 2/2010 | Tessier | F24F 11/0086 236/94 |
| 2010/0070086 | A1* | 3/2010 | Harrod | F24F 11/0086 700/276 |
| 2010/0083356 | A1* | 4/2010 | Steckley | H04L 12/2818 726/5 |
| 2010/0170272 | A1* | 7/2010 | Deangelis | F24F 11/0086 62/157 |
| 2010/0262313 | A1* | 10/2010 | Chambers | G05B 15/02 700/295 |

(Continued)

*Primary Examiner* — Adam Lee
(74) *Attorney, Agent, or Firm* — Baker Botts L.L.P.

(57) ABSTRACT

In an embodiment, a method for device-assisted adjustment of a HVAC unit controller is provided. A HVAC unit controller receives a geographical location from a device over a data connection. The HVAC unit controller obtains location-specific setting information. The location-specific setting information is specific to the geographical location. The HVAC unit controller adjusts one or more settings of the HVAC unit controller in accordance with the location-specific setting information.

36 Claims, 6 Drawing Sheets

(56) References Cited

U.S. PATENT DOCUMENTS

| | | | |
|---|---|---|---|
| 2011/0290893 A1* | 12/2011 | Steinberg | F24F 11/0034 236/49.3 |
| 2012/0130924 A1* | 5/2012 | James | G01W 1/10 705/412 |
| 2012/0193505 A1* | 8/2012 | Baron | F24F 1/40 248/636 |
| 2012/0277916 A1* | 11/2012 | Delorme | B60H 1/00642 700/276 |
| 2014/0031991 A1* | 1/2014 | Bergman | G05D 23/19 700/276 |
| 2014/0045482 A1* | 2/2014 | Bisson | H04W 4/021 455/420 |
| 2014/0058567 A1* | 2/2014 | Matsuoka | G05D 23/1917 700/276 |
| 2014/0058806 A1* | 2/2014 | Guenette | F24F 11/006 705/14.1 |
| 2014/0151456 A1* | 6/2014 | McCurnin | G05D 23/1905 236/51 |
| 2014/0207289 A1* | 7/2014 | Golden | G06F 3/0484 700/276 |
| 2015/0159893 A1* | 6/2015 | Daubman | F24F 11/001 700/278 |

\* cited by examiner

DEVICE ASSISTED SETTINGS ADJUSTMENT FOR HVAC CONTROLLERS

TECHNICAL FIELD

This application relates to heating, ventilation, and/or air conditioning unit controllers and, more particularly, to adjustment of unit controller settings.

BACKGROUND

Heating, Ventilation, and Air Conditioning (HVAC) unit controllers have settings that can be adjusted to fit particular needs. As one example, HVAC controllers commonly have a climate setting that can be adjusted between moderate, humid, and dry. This setting controls when the controller will operate the dehumidifier to perform dehumidification. The proper value for the setting depends on whether the HVAC unit is in a moderate, dry, or humid climate. If set incorrectly the dehumidifier may dehumidify a building too much, or may not dehumidify the building enough.

Conventionally, an installing technician or homeowner enters the necessary setting values when the HVAC unit is installed. This manual entry of information is time consuming and prone to errors. For example, the climate setting can accommodate moderate, humid, and dry climates, but a technician will generally install HVAC units in a single geographical area with a single climate. The technician must nonetheless adjust the climate setting every time the technician installs a unit. If the technician makes a mistake and enters the climate setting incorrectly, the controller may operate the dehumidifier improperly until the error is discovered.

It would be desirable if the settings of an HVAC unit controller could be adjusted quickly and reliably. Where a correct setting can be determined automatically with a high degree of confidence, it would be desirable for the setting to be adjusted automatically.

SUMMARY

In an embodiment, a method for device-assisted adjustment of a HVAC unit controller is provided. A HVAC unit controller receives a geographical location from a device over a data connection. The HVAC unit controller obtains location-specific setting information. The location-specific setting information is specific to the geographical location. The HVAC unit controller adjusts one or more settings of the HVAC unit controller in accordance with the location-specific setting information.

DESCRIPTION OF DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

Figure 1:
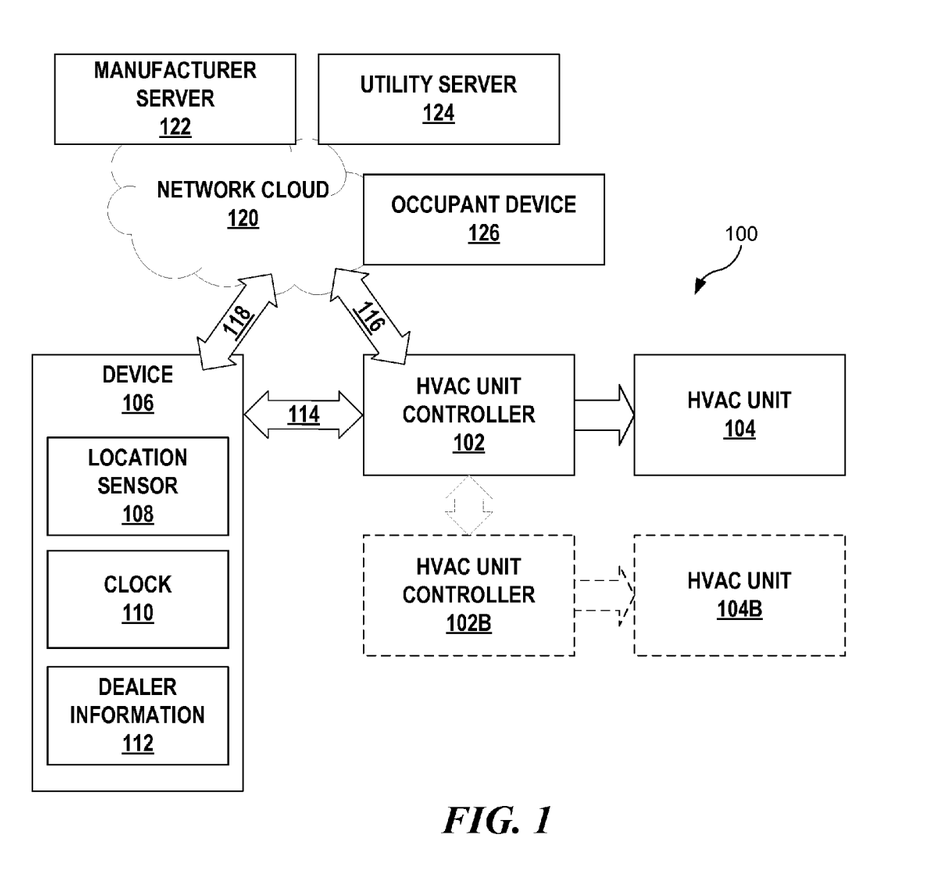
FIG. 1 depicts a system for device-assisted settings adjustment of an HVAC controller.

Referring to FIG. 1, depicted is a system 100 for device-assisted settings adjustment of an HVAC controller. System 100 includes HVAC unit controller 102, a controller having settings that can be adjusted. Controller 102 may control unit 104. Unit 104 may contain mechanical components that can provide heating, ventilation, and/or air conditioning to a building or other enclosed space. Possible enclosed spaces include residential homes, commercial buildings, and refrigeration units. For simplicity, the term "building" will be used to describe the enclosed space.

As used herein, the term "HVAC" when applied to a device does not mean the device must have all of heating, ventilation, and air conditioning capabilities. The device may have some or all of those capabilities. As used herein, the term "air conditioning" includes refrigeration.

Controller 102 may command unit 104 on how to operate. The operation of unit 104 may meet HVAC needs of the building. Controller 102 may have an electronic memory containing settings. The commands which controller 102 sends to unit 104 may depend at least in part on how the settings in the memory of controller 102 are adjusted. Controller 102 may also have a user interface, including a display, for viewing information and entering settings.

Device 106 may assist a technician or homeowner in adjusting settings of controller 102. Device 106 may be a smartphone, tablet, or other device. Device 106 may include location sensor 108, a sensor that can determine the geographic location of device 106. Location sensor 108 may determine the geographic location of device 106 based on GPS, Wi-Fi settings, network settings such as Internet Protocol (IP) address, or one or more other location sensing techniques. Device 106 may include clock 110, a clock which may keep track of the current time and time zone at the location of device 106. Device 106 is may be located at the same geographic location as controller 102, so that the location from location sensor 108 is also the location of controller 102. Controller 102 may assume that the location from location sensor 108 is the location of controller 102.

Device 106 may optionally store dealer information 112. Dealer information 112 may be contact information and other information identifying a dealer who can service HVAC unit controller 102. Dealer information 112 may include an address, phone number, e-mail address, and ID number for the dealer.

Device 106 may present a list of possible dealers to a technician. The technician may select a dealer associated with the technician from the list. Information for the selected dealer may become dealer information 112.

Device 106 may have a data connection 114 to controller 102. Data connection 114 may be a Wi-Fi connection, a Bluetooth connection, Universal Serial Bus (USB) connection, a wired network connection, or another type of data connection. Device 106 may send data to controller 102 over data connection 114. Device 106 may also receive data from controller 102 over data connection 114. In particular, controller 102 may send its configuration, including its settings, to device 106.

Controller 102 may have network connection 116, giving controller 102 access to network cloud 120. Network cloud 120 may include one or more network devices that controller 102 may send data to and receive data from. The network devices may include manufacturer server 122, utility server 124, and occupant device 126.

Device 106 may have network connection 118, giving device 106 access to network cloud 120. Device 106 may send data to and receive data from network devices in network cloud 120, including manufacturer server 122, utility server 124, and occupant device 126. Network connection 118 may be used as an alternative to network connection 116 where network connection 116 does not exist or is not available.

Manufacturer server 122 may be a computer server having data provided by the manufacturer of HVAC unit controller 102. Utility server 124 may be a computer server having data provided by one or more utility providers. Occupant device 126 may be a device at the physical location of an occupant of the building. For example, occupant device 126 may be a mobile phone carried by the occupant. Network cloud 120 may be the Internet and network connections 116 and 118 may be Internet connections. The network devices in network cloud 120, including manufacturer server 122, utility server 124, and occupant device 126, may be accessible through the Internet. Occupant device 126 and device 106 may be the same device.

Controller 102 may optionally be connected to and communicate with one or more additional controllers 102B. These additional controllers may each control additional HVAC units 104B. Typically, any additional controllers 102B and additional HVAC units 104B are in different locations of the same building as controller 102 and HVAC unit 104. For example, controller 102 and HVAC unit 104 may be on the first floor of a building, and a controller 102B and HVAC unit 104B may be on the second floor of the same building. Collectively, controller 102, unit 104, and any connected controllers 102B and their units 104B may be called a "HVAC system."

Figure 2:
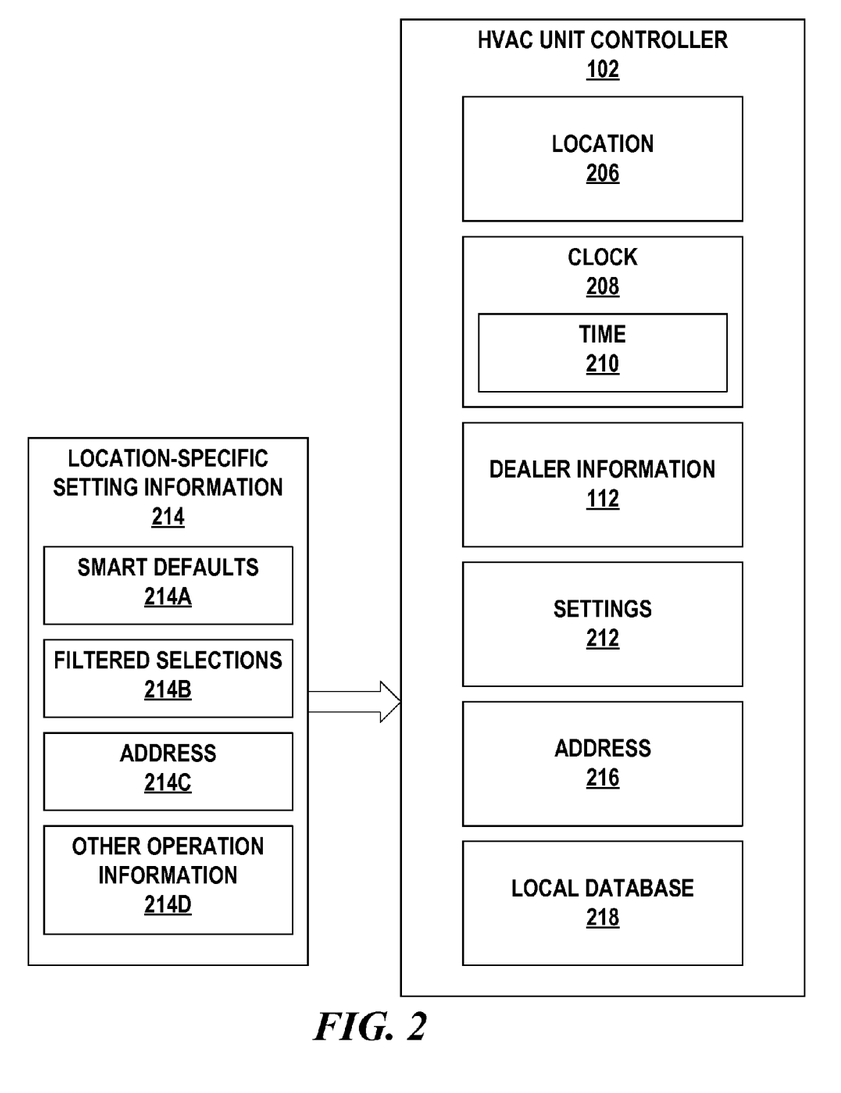
FIG. 2 depicts exemplary information utilized by controller 102 in adjusting its settings.

Referring to FIG. 2, depicted is exemplary information utilized by controller 102 in adjusting its settings. Controller 102 may receive geographical location 206 from location sensor 108 of device 106. Location 206 may be a set of geographical coordinates. Controller 102 may have a clock 208 which is set with a time 210 provided by clock 110 of device 106. Time 210 may include both the time and time zone at location 206. Controller 102 may also receive dealer information 112 from device 106.

Controller 102 may have an electronic memory storing settings 212. Settings 212 may affect the operation of controller 102, including the commands controller 102 sends to unit 104. A variety of settings 212 are possible, as will be discussed below.

Controller 102 may pass location 206 over network connection 116 to a network device such as manufacturer server 122. In response, the network device may send location-specific setting information 214 to controller 102.

Location-specific setting information 214 may include smart defaults 214A. Smart defaults 214A may be default setting values which depend on location 206. For example, suppose controller 102 has a temperature display setting that can be adjusted to display temperatures in either degrees Fahrenheit or degrees Celsius. Fahrenheit is typically preferred in the United States, while Celsius is typically preferred in Canada or Australia. Location 206 may identify whether controller 102 is in the United States, Canada, or Australia. Smart defaults 214A may determine whether controller 102 should adjust the language setting to displaying temperatures in degrees Fahrenheit or degrees Celsius.

Location-specific setting information 214 may also include filtered selections 214B. While smart defaults 214A may allow controller 102 to adjust a setting automatically, filtered selections 214B may still require a user to select from a number of possible setting values. Filtered selections 214B may be used where no single setting value is appropriate as a smart default 214A.

As an example, controller 102 may have a language setting 212 that determines which language controller 102 uses in its user interface. If controller 102 is located in the United States, a smart default 214A adjusting the language setting 212 to English may be appropriate. However, if controller 102 is located in an area of Canada where English and French are both common, a filtered selection 214B where the user is prompted to choose between English and French setting values may be appropriate.

A controller 102 which communicates with additional controllers 102B may provide the selected setting values to the other controllers 102B. For example, in an area where multiple languages are common, a selected language for controller 102 may be appropriate as a selected language for other connected controllers 102B.

Location-specific setting information 214 may include address 214C, the address where controller 102 is located. The address may be a more precise identification of where controller 102 is located than location 206. Controller 102 may store address 214C as address 216 upon receiving confirmation address 214C is correct. Controller 102 may use address 214C to obtain additional location-specific setting information 214, as will be described below.

Location-specific setting information 214 may include other operation information 214D. In some cases, controller 102 may receive information which affects how controller 102 is set to operate, but which is not a smart default 214A, filtered selection 214B, or address 214C. As an example, occupant device 126 may notify controller 102 that occupant device 126 is near location 206. The notification may cause controller 102 to set itself to condition the building for the comfort of the occupant.

As an alternative to or in addition obtaining location-specific setting information from a network device such as manufacturer server 122, controller 102 may store local database 218 containing location-specific setting information 214 for a variety of locations. After receiving location 206, controller 102 may search local database 218 for location-specific setting information 214 for location 206. If location-specific setting information 214 is not found in local database 218, controller 102 may send location 206 to a network device such as manufacturer server 122. For a given location 206, some location-specific setting information 214 may be found in local database 218, while other location-specific setting information 214 may be received from a network device.

Network connection 118 may be used in place of network connection 116 to obtain location-specific setting information 214 from a network device such as manufacturer server 122. Device 106 may send location 206 over network connection 118 to the network device. The network device may send location-specific setting information 214 to device 106. Device 106 may send location-specific setting information 214 to controller 102 over data connection 114.

Network connection 118 may still be used if controller 102 has local database 218. Device 106 may first provide location 206 to controller 102. Controller 102 may obtain any location-specific setting adjustments 214 for location 206 stored in local database 218. To obtain any location-specific setting adjustments 214 not found in local database 218, controller 102 may notify device 106 to request the location-specific setting adjustments 214. Device 106 may then send location 206 to the network device such as manufacturer server 122.

In FIG. 2, location 206 and address 216 are shown separately from settings 212 for ease of discussion. However, location 206 and address 216 may be included within settings 212. Location 206 and address 216 may affect the operation of controller 102 like other settings 212.

Figure 3:
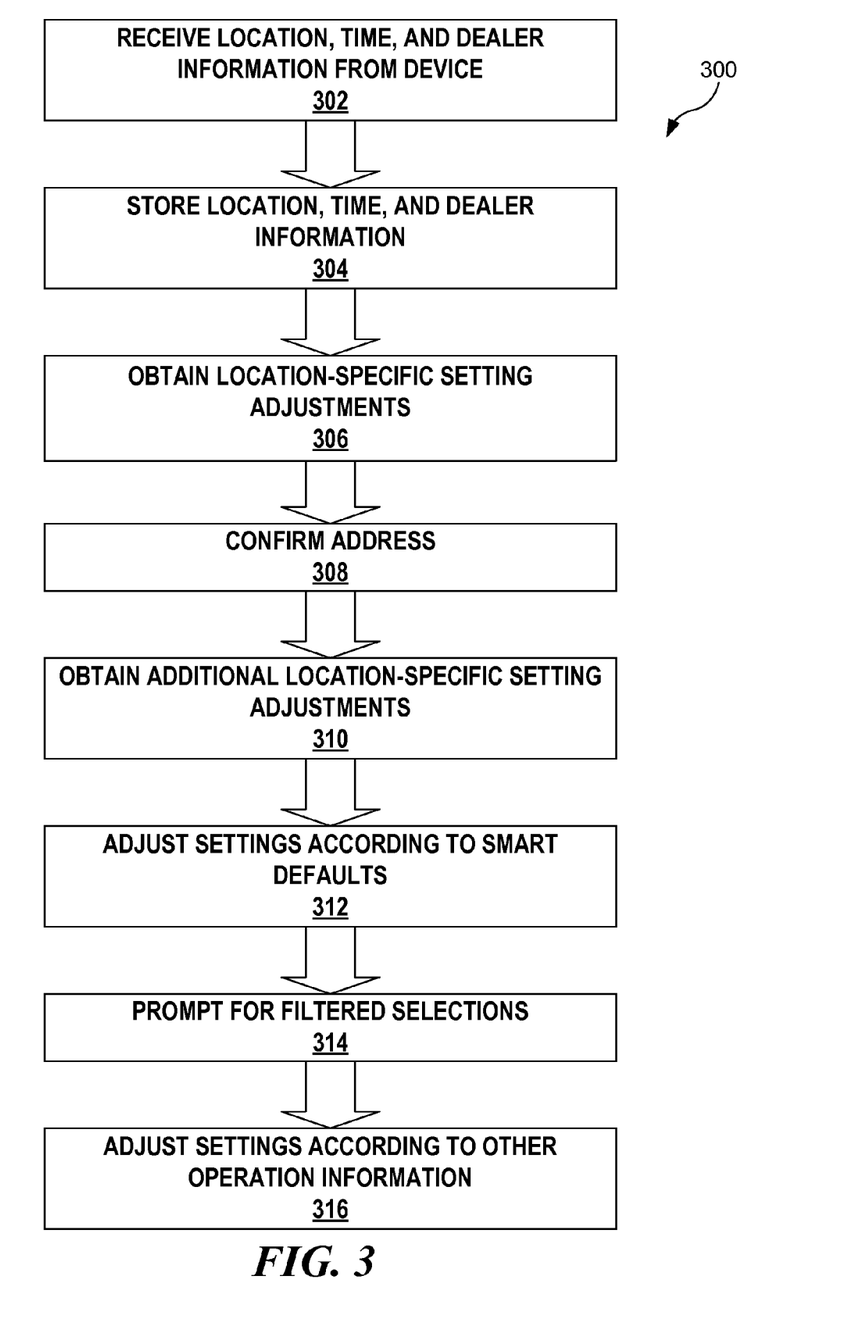
FIG. 3 depicts an exemplary method which an HVAC controller may perform to adjust its settings.

Referring to FIG. 3, depicted is a method 300 which controller 102 may perform to adjust its settings 212. At 302, controller 102 may receive location 206, time 210, and dealer information 112 from device 106 over data connection 114. Device 106 may obtain location 206 from location sensor 108 and time 210 from clock 110.

At 304, controller 102 may store location 206, time 210, and dealer information 112. Time 210 may be used to set the time on clock 208. Controller 102 may later display dealer information 112 when the HVAC system requires maintenance.

At 306, controller 102 may obtain location-specific setting information 214 specific to location 206. Location-specific setting information 214 may be provided by manufacturer server 122 or local database 218. Location-specific setting information 214 may also be provided by another network device in network cloud 120, such as utility server 214.

At 308, controller 102 may request confirmation of address 214C from a user. The user may be a technician or homeowner installing controller 102. Confirmation is desirable because the ability of manufacturer server 122 or local database 218 to find an address corresponding to location 206 may not be perfect. For instance, in a residential neighborhood, 306 may sometimes produce the address of a neighboring residence. The user may confirm address 214C is correct using the user interface of controller 102. If address 214C is incorrect, the user may enter the correct address. The correct address may be stored as address 216.

At 310, controller 102 may obtain additional location-specific setting information 214 specific to address 216. Controller 102 may send address 216 to a location in network cloud 116 and receive the additional location-specific setting information 214 from the location in response.

At 312, controller 102 may adjust settings 212 according to any smart defaults 214A. At 314, controller 102 may prompt the user to select from setting adjustments in any filtered selections 214B. The selected setting adjustments may be used to adjust settings 212. At 316, controller 102 may adjust settings 212 according to any other operation information 214D.

Figure 4:
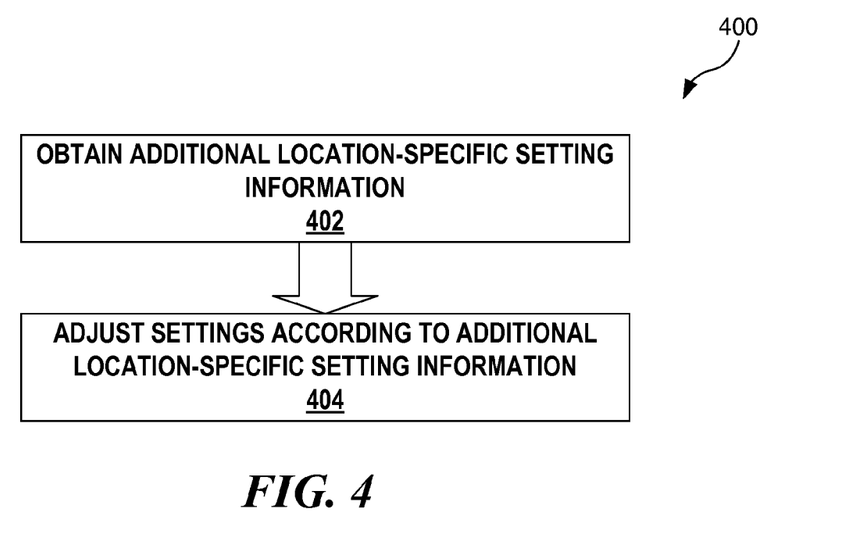
FIG. 4 depicts an exemplary method which an HVAC controller may perform keep its settings up to date.

Referring to FIG. 4, depicted is a method 400 which controller 102 may perform to keep its settings 212 up to date. The appropriate values for some settings 212 may change over time. Controller 102 may perform method 400 periodically.

At 402, controller 102 may send location 206, address 216, or both to one or more locations in network cloud 120. These locations may include manufacturer server 122, utility server 124, and occupant device 126. The locations may respond by providing additional location-specific setting information 214.

The location-specific setting information 214 will typically be smart defaults 214A or other operation information 214D. Address 216C is typically already available and a user is not necessarily available to select from filtered selections 214B. At 404, controller 102 may adjust settings 212 according to the additional location-specific setting information 214. 404 may be performed as in 312, 314, and/or 316, depending on which of smart defaults 214A, filtered selections 214B, and other operation information 214D were received in the additional location-specific setting information 214.

Figure 5:
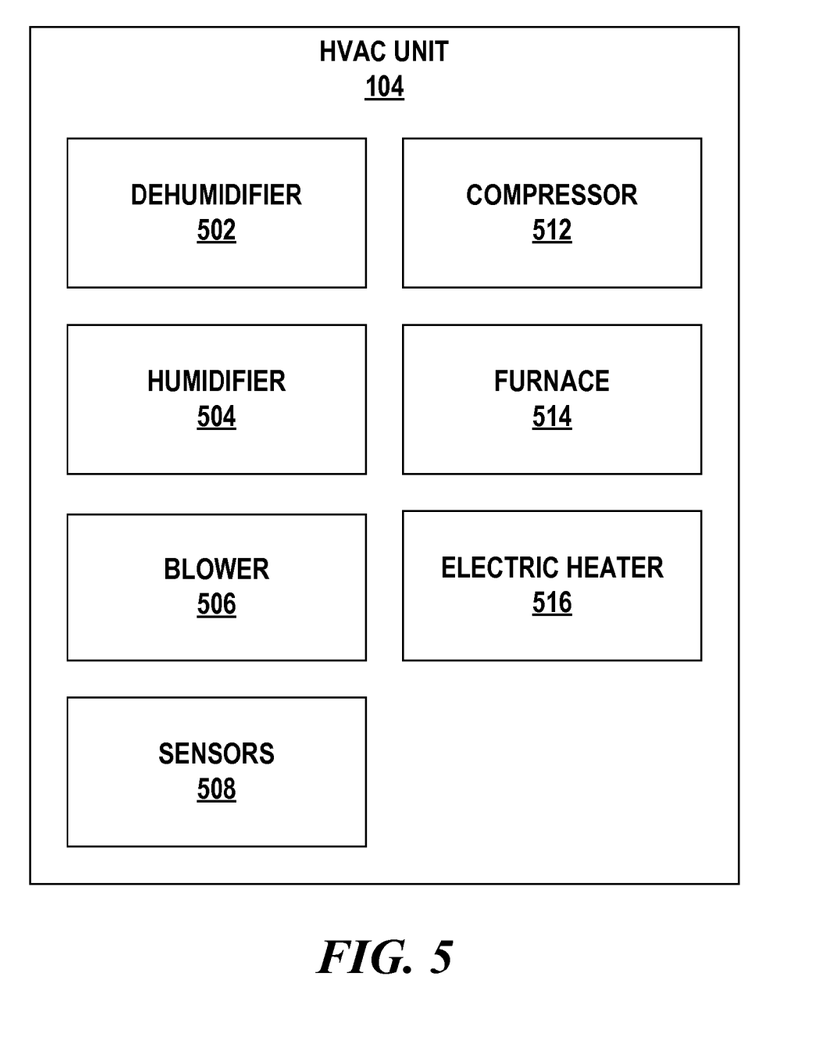
FIG. 5 depicts exemplary devices which may be affected by HVAC controller settings.

Referring to FIG. 5, depicted are some exemplary components of an HVAC unit 104 which may be affected by location-specific setting information 214. Other components not shown may also be affected. Dehumidifier 502 may dehumidify the building. Humidifier 504 may humidify the building.

Blower 506 may create airflow through HVAC unit 104. By adjusting the speed of the motor of blower 506, controller 102 may adjust the amount of airflow through HVAC unit 104. Sensors 508 may sense conditions related to the operation of HVAC unit 104. For example, sensors 508 may include sensors measuring the temperature inside the building, the humidity inside the building, the outdoor temperature, the humidity outside the building, and the temperature of air discharged from HVAC unit 104 into the building.

Compressor 512 may compress refrigerant in a vapor compression cycle. The vapor compression cycle may mechanically heat or cool the building. Compressor 512 may be part of an air conditioner, a heater, or a reversible heat pump. When compressor 512 is operating, it typically consumes a significant amount of the overall energy used by HVAC unit 104. One way controller 102 can adjust the energy consumption of HVAC unit 104 is by adjusting the air temperatures, called set-points, which cause controller 102 to start and stop operating compressor 512. The set-points may be indoor air temperatures, such as an indoor air temperature that causes controller 102 to use compressor 512 to cool the building. The set-points may also be outdoor air temperatures, such as an outdoor air temperature that causes controller 102 to cool the building by bringing in outdoor air and not using compressor 512.

Furnace 214 and electric heater 516 may be alternate heat sources that may heat the building. In very cold temperatures, a reversible heat pump or heater including compressor 512 may be unavailable for heating.

Figure 6:
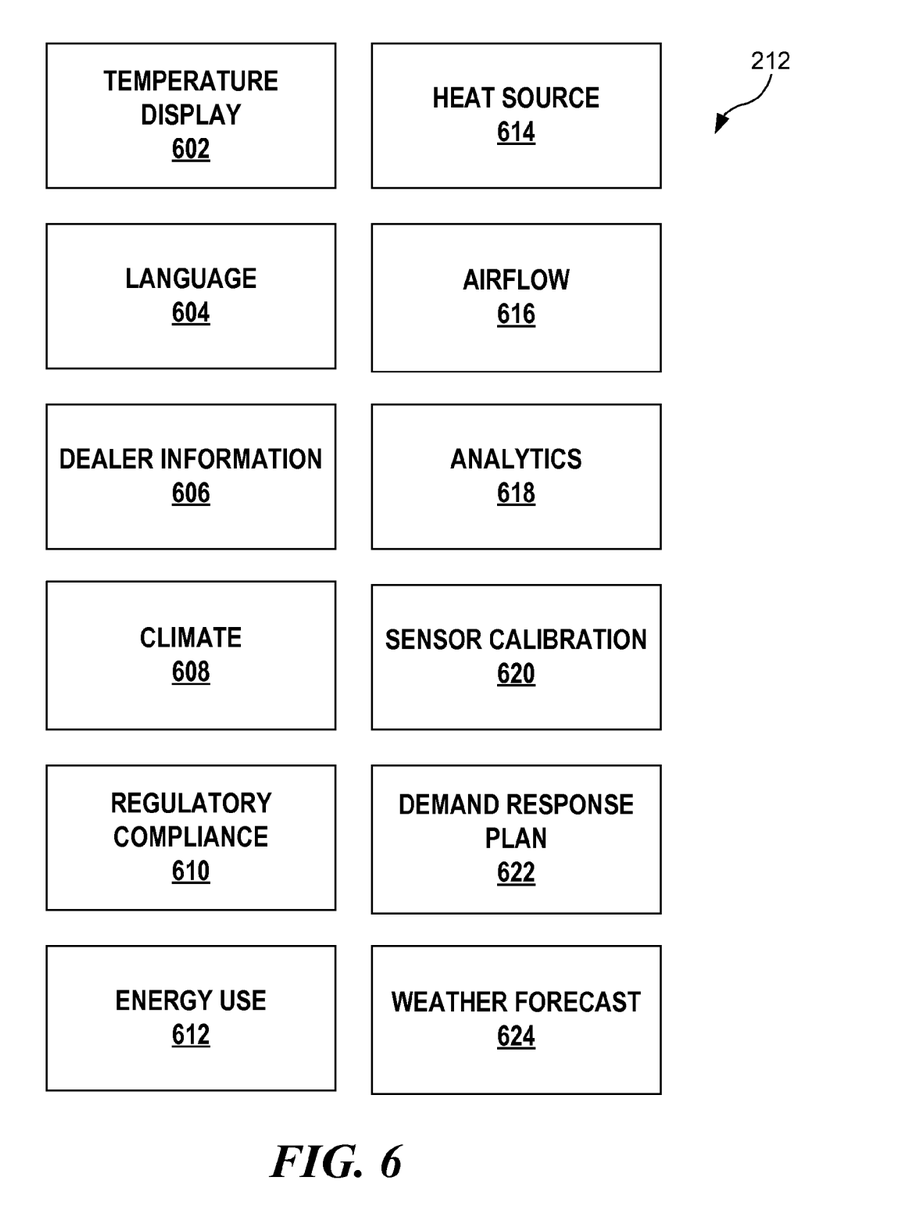
FIG. 6 depicts some location-based settings which may be adjusted according to smart defaults and filtered selections.

Referring to FIG. 6, depicted are some location-based settings 212 which may be adjusted according to smart defaults 214A, filtered selections 214B, and other operation information 214C. Other location-based settings 212 are possible, and a controller 102 may have only some of the location-based settings 212 shown. The groups shown in FIG. 6 may overlap, with some settings in more than one group.

Temperature display setting 602 may determine whether controller 102 displays temperatures in degrees Fahrenheit or degrees Celsius. As discussed previously, location-specific setting information 214 may provide a smart default 214A for adjusting the setting to the temperature scale commonly used at the location 206 of controller 102.

Language setting 604 may determine which language controller 102 uses in its user interface. As discussed previously, location-specific setting information 214 may provide a smart default 214A to a language commonly used at the location 206 of controller 102. Where multiple languages are commonly used, location-specific setting information 214 may provide a filtered selection 214B.

As an alternative to device 106 providing dealer information 112, controller 102 may have a dealer information setting 606. Like dealer information 112, dealer information setting 606 may be contact information and other information identifying a dealer who can service HVAC unit controller 102. Location-specific setting information 214 may include filtered selections 214B for nearby dealers. Because filtered selections 214B are specific to location 206, the user does not have to choose among all dealers worldwide. Other than how it is selected, dealer information setting 606 may be and be used identically to dealer information 112.

Climate setting 608 may identify whether the climate at the location is moderate, humid, or dry. Climate setting 608 may affect when controller 102 operates dehumidifier 502. In moderate regions like Austin or Dallas, Tex., or along the California coastline, the climate setting should be set to moderate. The moderate climate setting causes controller 102 to perform dehumidification only with cooling. In humid regions like the state of Florida or Houston, Tex., the climate setting should be set to humid. The humid climate setting causes controller 102 to perform dehumidification independent of cooling. In dry regions like the state of Arizona, the climate setting should be set to dry. The dry climate setting causes controller 102 to not perform dehumidification and only show the current humidity. Location-specific setting information 214 may provide a smart default 214A to an appropriate climate setting for location 206.

Regulatory compliance settings 610 may be one or more settings with values mandated by regulations in certain locations. For example, California has Title 24 regulations that govern commercial HVAC units. Regulations may require that certain alarms be enabled, such as an alarm for when a damper is stuck. Regulations may also require that compressor 512 not be used when outdoor air is suitable for cooling. Regulations may also require ventilation be dynamically controlled.

Settings for what alarms are enabled, when compressor 512 is used, and whether to dynamically control ventilation may be included in regulatory compliance settings 610. When location 206 is a location where regulatory compliance settings 610 have mandated values, location-specific setting information 214 may include smart defaults 214A to the mandated values.

Energy use settings 612 may be one or more settings which can increase comfort at the expense of energy. The set-points are an example. Another example is the differentials for the various stages of heating or cooling. For example, when the difference between the temperature and a set-point exceeds half of a "first differential" then controller 102 may begin a first stage of heating or cooling. When the difference additionally exceeds a "second differential" then controller 102 may begin a second stage of heating or cooling. This second stage may be a response to the first stage being unable to satisfy the heating or cooling demand of the building. Thus, the second stage may consume more energy than the first stage to meet the demand. Decreasing the differentials may cause controller 102 to heat or cool the building more rapidly, but consume more energy. Increasing the differentials may cause controller 102 to heat or cool the building more slowly, but consume less energy.

If location 206 is a region with a high cost of energy, energy use settings 612 may be set by smart defaults 214A to use less energy than is typical. If location 206 is a region with a low cost of energy, energy use settings 612 may be set by smart defaults 214A to use more energy than is typical. Energy use settings 612 may overlap with regulatory compliance settings 610. In such cases, smart defaults 214A necessary for regulatory compliance should control.

The appropriate energy use settings 612 may vary over time as the cost of energy in a region may vary over time. Energy use settings 612 may be kept up to date using method 400.

Controller 102 may also adjust energy use settings according to whether occupant device 126 is near location 206. "Near" may be defined as within a certain distance from location 206. This adjustment may be performed using method 400. For privacy reasons, controller 102 may send location 206 to occupant device 126, rather than occupant device 126 sending its location to controller 206. Occupant device 126 may determine if it is near location 206, such as by comparing location 206 with a location from a location sensor of occupant device 126.

Occupant device 126 may inform controller 102 if occupant device 126 is near. This information may be provided as other operation information 214D. If occupant device 126 is near, controller 102 may use energy use settings 612 that prioritize comfort over efficiency. If occupant device 126 is not near, controller 102 may use energy use settings 612 that prioritize efficiency over comfort.

Heat source settings 614 may be one or more settings used in determining a heat source for heating. HVAC unit 104 may have multiple possible heat sources, such as a heat pump using compressor 512, furnace 514, and electric heater 516. The best heat source to use may depend on the utility provider and utility plan of the building. For example, a gas furnace 514 may be more desirable than electric heater 516 when the utility plan offers relatively low gas prices. The utility provider and utility plan may accordingly be heat source settings 614.

Location-specific setting information 214 may include filtered selections 214B to nearby utility providers and utility plans. Because filtered selections 214B are specific to location 206, the user does not have to choose among all utility providers and utility plans worldwide.

Alternately, smart defaults 214A to the correct heat source settings 614 may be obtained from utility server 124. The correct smart defaults 214A may depend on the exact address 216 rather than a more general location 206. In method 300, a smart default 214A for heat source settings 614 may be received at 310, after address 216 is known. Controller 102 may send address 216 to utility server 124. Utility server 124 may send to controller 102 smart defaults 214A identifying the utility provider and utility plan. Controller 102 may adjust heat source settings 622 to the smart defaults 214A.

The utility provider and utility plan for an address may change over time. Heat source settings 622 may be kept up to date through method 400. Periodically, controller 102 may send address 216 to utility server 124, and utility server 124 may respond with smart defaults 214A identifying the utility provider and utility plan for address 216.

Airflow settings 616 may be one or more settings used in determining airflow through the building. The comfort of the building depends in part on the airflow. Different buildings have different characteristics that affect the airflow. One such characteristic is the elevation of the building. An exemplary airflow setting 616 is an elevation setting identifying the elevation of location 206. The correct elevation may be provided as a smart default 214A. Using airflow settings 616, controller 102 may better determine the airflow. Using the airflow, controller 102 may optimize the speed of the motor of blower 506, improving the comfort of the building.

Analytics settings 618 may be one or more settings used in creating a model of the expected operation of HVAC unit 104 in the building. This model may be used to determine, for example, how long the building should take to heat or cool. Creating the model may require location-specific information such as the outdoor temperature at a particular time.

Controller 102 may obtain this location-specific information as other operation information 214D. Controller 102 may use method 400 to regularly obtain the outdoor temperature. After creating the model, controller 102 may determine when HVAC unit 104 is operating inconsistently with the model. This operation may indicate, for example, an open window in the building or HVAC unit 104 needing servicing by a dealer. Controller 102 may notify an occupant of the building of the inconsistent operation.

Alternately, a server such as manufacturer server 122 may create the model. Controller 102 may send location 206 to the server in addition to real-time data about the operation of HVAC unit 104. The server may create the model from the real-time data and compare subsequent real-time data to the model. The server may notify controller 102 when the real-time data is inconsistent with the model. This notification may be other operation information 214D. Alternately, the server may notify an occupant of the building without controller 102, such as by instructing a person to call the building.

Sensor calibration settings 620 may be one or more settings which calibrate sensors 508. How sensors 508 should be calibrated may depend on the location of HVAC unit 104. The correct calibration for a region with a humid climate may be different from the correct calibration for a region with a moderate climate. Location-specific setting information 214 may provide smart defaults 214A to appropriate sensor calibration settings 620 for location 206.

Furthermore, how sensors 508 should be calibrated may depend on the weather at the location of HVAC unit 104. Controller 102 may dynamically calibrate sensors 508 with method 400. Manufacturer server 122 may periodically provide smart defaults 214A to appropriate sensor calibration settings 620 for the weather at location 206.

Manufacturer server 122 may also periodically provide controller 102 with reference temperatures for location 206. These reference temperatures may be provided as other operation information 214D. Controller 102 may use the reference temperatures to calibrate sensors 508.

Demand response plan settings 622 may be one or more settings that identify the demand response plan that controller 102 should follow. Some utility providers offer demand response plans that incentivize users to consume electricity at certain times. For example, a consumer may be enrolled in a demand response program offering free night or free weekend electricity use. Controller 102 may adapt its energy use to the demand response plan. Controller 102 may determine it should increase its electricity usage during some times and decrease its electricity usage during other times.

Demand response plan settings 622 may be set similarly to the utility provider and utility plan of heat source settings 614. Location-specific setting information 214 may include filtered selections 214B to nearby demand response plans. Because filtered selections 214B are specific to location 206, the user does not have to choose among all demand response plans worldwide.

Alternately, a smart default 214A to the correct demand response plan settings 622 may be obtained from utility server 124. The correct demand response plan settings 622 may depend on the exact address 216 rather than a more general location 206. In method 300, a smart default 214A for demand response plan settings 622 may be received at 310, after address 216 is known. Controller 102 may send address 216 to utility server 124. Utility server 124 may send to controller 102 a smart default 214A identifying the demand response plan. Controller 102 may adjust demand response plan settings 622 to the smart default 214A.

The demand response plan for an address may change over time. Demand response plan settings 622 may be kept up to date through method 400. Periodically, controller 102 may send address 216 to utility server 124, and utility server 124 may respond with a smart default 214A identifying the demand response plan for address 216.

If a consumer is not enrolled in a demand response plan, controller 102 may ask the consumer to consent to receiving information about demand response plans. The consumer may provide the consent using the user interface of controller 102. Controller 102 may send address 216 and notification of the consent to manufacturer server 124. Manufacturer server 124 may provide the consent to a utility in the region. The utility may send communications to the consumer about available demand response plans. The communications may be sent by mail to the address, or by e-mail if an e-mail address is known for the address.

Weather forecast settings 624 may be one or more settings used by controller 102 in responding to weather forecasts. Using method 400, controller 102 may regularly obtain weather forecast settings 624 for location 206. Controller 102 may send location 206 to manufacturer server 122, and manufacturer server 122 may respond with smart defaults 214A for weather forecast settings 624. Weather forecast settings 624 may, for example, cause controller 102 to pre-cool or pre-heat the building in response to forecasted weather. In response to forecasted hot weather, controller 102 may pre-cool the building. In response to forecasted cold weather, controller 102 may pre-heat the building. Due to the pre-cooling or pre-heating, occupants of the building may avoid discomfort caused by a change in the weather. Weather forecast settings 624 may comprise the forecasted weather. Weather forecast settings 624 may alternately or additionally comprise instructions to perform the pre-cooling or pre-heating.

Device-assisted settings adjustment of HVAC controller settings has several advantages. Through smart defaults 214A and filtered selections 214B, device-assisted settings adjustment can reduce the time needed to install an HVAC unit. Because less information must be manually entered, the likelihood of errors is reduced. Because incorrect settings 212 can waste energy, device-assisted settings adjustment can result in energy savings.

The access to data from the network cloud reduces barriers to entry for "smart" HVAC features. These smart features in turn can save energy and optimize energy use. As an example, as previously discussed an HVAC system can adjust its settings to take advantage of demand response programs. The reduced barriers to entry increase the likelihood users will take advantage of these smart features.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features.

Many such variations and modifications may be considered desirable by those skilled in the art based upon a review of the foregoing description of various embodiments.

We claim:

1. A method for device-assisted settings adjustment of a HVAC unit controller, the method comprising:
   the HVAC unit controller receiving a geographical location from a device over a data connection, wherein said geographical location is the geographical location of said HVAC unit controller;
   the HVAC unit controller obtaining location-specific setting information, the location-specific setting information specific to the geographical location; and
   the HVAC unit controller adjusting one or more settings of the HVAC unit controller in accordance with the location-specific setting information, wherein the location-specific setting information comprises a regulatory compliance setting specific to the geographical location and an energy use setting specific to the geographical location and when the regulatory compliance setting and energy use setting overlap the regulatory compliance setting dictates the one or more settings of the HVAC unit controller.

2. The method of claim 1, wherein the location-specific setting information further comprises one or more smart defaults, and further comprising the HVAC unit controller adjusting the one or more settings in accordance with the one or more smart defaults.

3. The method of claim 1, wherein the HVAC unit controller obtaining the location-specific setting information comprises:
   the HVAC unit controller sending the geographical location to a second device; and
   the HVAC unit controller receiving the location-specific setting information from said second device.

4. The method of claim 1, wherein obtaining the location-specific setting information comprises searching a local database for the location-specific setting information, the HVAC unit controller storing the local database.

5. The method of claim 1, wherein the one or more settings comprises a language setting.

6. The method of claim 1, wherein the one or more settings comprises a climate setting, and further comprising the IIVAC unit controller operating a dehumidifier in accordance with the climate setting.

7. The method of claim 1, further comprising the HVAC unit controller receiving dealer information from the device.

8. The method of claim 1, wherein the one or more settings comprises a dealer information setting.

9. The method of claim 1, further comprising the HVAC unit controller receiving a time from the device, the time comprising a time zone.

10. The method of claim 1, wherein the location-specific setting information further comprises an address.

11. The method of claim 1, wherein the regulatory compliance setting comprises one or more smart defaults set to one or more values mandated by regulations specific to the geographical location.

12. The method of claim 1, wherein the energy use setting comprises one or more settings that increase comfort at the expense of energy based on the cost of energy specific to the geographical location.

13. The method of claim 1, wherein the location-specific setting information further comprises a heat source setting.

14. The method of claim 1, wherein the location-specific setting information further comprises an airflow setting.

15. The method of claim 1, wherein the location-specific setting information further comprises an analytics setting.

16. The method of claim 1, wherein the location-specific setting information further comprises a sensor calibration setting.

17. The method of claim 1, wherein the location-specific setting information further comprises a demand response plan setting.

18. The method of claim 1, wherein the location-specific setting information further comprises a weather forecast setting.

19. An HVAC unit controller having device-assisted settings adjustment, the HVAC unit controller comprising a configuration to:
   receive a geographical location from a device over a data connection, wherein said geographical location is the location of said HVAC unit controller;
   obtain location-specific setting information, the location-specific setting information specific to the geographical location; and
   adjust one or more settings of the HVAC unit controller in accordance with the location-specific setting information, wherein the location-specific setting information comprises a regulatory compliance setting specific to the geographical location and an energy use setting specific to the geographical location and when the regulatory compliance setting and energy use setting overlap the regulatory compliance setting dictates the one or more settings of the HVAC unit controller.

20. The HVAC unit controller of claim 19, wherein the location-specific setting information further comprises one or more smart defaults, and wherein the HVAC unit controller is further configured to adjust the one or more settings in accordance with the one or more smart defaults.

21. The HVAC unit controller of claim 19, wherein the configuration to obtain the location-specific setting information comprises a configuration to:
   send the geographical location to a second device; and
   receive the location-specific setting information from said second device.

22. The HVAC unit controller of claim 19, wherein the configuration to obtain the location-specific setting information comprises a configuration to search a local database for the location-specific setting information, the local database stored by the HVAC unit controller.

23. The HVAC unit controller of claim 19, wherein the one or more settings comprises a language setting.

24. The HVAC unit controller of claim 19, wherein the one or more settings comprises a climate setting, and wherein the HVAC unit controller is further configured to operate a dehumidifier in accordance with the climate setting.

25. The HVAC unit controller of claim 19, further comprising the HVAC unit controller receiving dealer information from the device.

26. The HVAC unit controller of claim 19, wherein the one or more settings comprises a dealer information setting.

27. The HVAC unit controller of claim 19, further comprising the HVAC unit controller receiving a time from the device, the time comprising a time zone.

28. The HVAC unit controller of claim 19, wherein the location-specific setting information further comprises an address.

29. The HVAC unit controller of claim 19, wherein the regulatory compliance setting comprises one or more smart defaults set to one or more values mandated by regulations specific to the geographical location.

30. The HVAC unit controller of claim 19, wherein the energy use setting comprises one or more settings that increase comfort at the expense of energy based on the cost of energy specific to the geographical location.

31. The HVAC unit controller of claim 19, wherein the location-specific setting information further comprises a heat source setting.

32. The HVAC unit controller of claim 19, wherein the location-specific setting information further comprises an airflow setting.

33. The HVAC unit controller of claim 19, wherein the location-specific setting information further comprises an analytics setting.

34. The HVAC unit controller of claim 19, wherein the location-specific setting information further comprises a sensor calibration setting.

35. The HVAC unit controller of claim 19, wherein the location-specific setting information further comprises a demand response plan setting.

36. The HVAC unit controller of claim 19, wherein the location-specific setting information further comprises a weather forecast setting.

* * * * *